United States Patent [19]
Grove
[11] Patent Number: 4,786,326
[45] Date of Patent: Nov. 22, 1988

[54] PROCESS FOR PENETRATING DIFFICULT-TO-TREAT WOOD WITH WOOD PRESERVATIVE LIQUIDS

[75] Inventor: Scott L. Grove, Lakewood, Ohio
[73] Assignee: Mooney Chemicals, Inc., Cleveland, Ohio

[21] Appl. No.: 101,955
[22] Filed: Sep. 28, 1987

Related U.S. Application Data

[63] Continuation-in-part of Ser. No. 930,133, Nov. 12, 1986, abandoned.

[51] Int. Cl.[4] ........................ C09D 15/05; B05D 3/00
[52] U.S. Cl. .................................. 106/15.05; 106/17; 106/18; 427/297; 428/921
[58] Field of Search .................... 427/297; 106/17, 18, 106/15.05; 428/921

[56] References Cited

U.S. PATENT DOCUMENTS

| | | | |
|---|---|---|---|
| 2,951,789 | 9/1960 | McCants | 167/38.5 |
| 3,199,211 | 8/1965 | Bescher | 34/9.5 |
| 3,200,003 | 8/1965 | Bescher | 117/59 |
| 3,617,314 | 11/1971 | Hill | 106/2 |
| 3,785,770 | 1/1974 | Hudson | 21/7 |
| 3,874,908 | 4/1975 | Liddell | 117/102 R |
| 4,013,804 | 3/1977 | Gruetzman | 427/33 |
| 4,051,282 | 9/1977 | Davies | 427/393 |
| 4,085,251 | 4/1978 | Rak | 428/485 |
| 4,374,852 | 2/1983 | Hilditch et al. | 424/289 |
| 4,507,152 | 3/1985 | Collins et al. | 106/18.31 |

FOREIGN PATENT DOCUMENTS

| | | |
|---|---|---|
| 972198 | 10/1964 | United Kingdom . |
| 1461630 | 1/1977 | United Kingdom . |

*Primary Examiner*—Theodore Morris
*Attorney, Agent, or Firm*—Renner, Otto, Boisselle & Sklar

[57] ABSTRACT

An improved process for penetrating of difficult-to-treat wood with preservative liquids containing metal salts is described. More particularly, the improved process comprises the steps of contacting the wood with a mixture comprising (A-1) a preservative-effective amount of at least one hydrocarbon-soluble metal salt of an organic carboxylic acid wherein the metal is selected from the group consisting of transition metals, zinc, mercury, antimony and lead, and (A-2) a hydrocarbon solvent comprising at least 50% by weight of at least one petroleum distillate.

The solvent utilized in the process of the invention optionally may contain one or more aromatic hydrocarbons. Preferably the solvent (A-2) will comprise at least about 50% of at least one paraffinic hydrocarbon having a boiling point above 130° C. The mixture also may contain other desirable components in addition to the metal salts such as insecticides, flame retardants, colorants, fungicides, water repellents, etc.

In a preferred embodiment, the metal salt of the organic carboxylic acid utilized in the process is a fungicide.

31 Claims, No Drawings

PROCESS FOR PENETRATING DIFFICULT-TO-TREAT WOOD WITH WOOD PRESERVATIVE LIQUIDS

CROSS-REFERENCE TO RELATED APPLICATION

This application is a continuation-in-part application of application Ser. No. 930,133, filed Nov. 12, 1986 now abandoned.

TECHNICAL FIELD OF THE INVENTION

The present invention relates to an improved process for preserving difficult-to-treat (refractory) wood such as Douglas fir, western hemlock, hemfir, etc. The invention also relates to the wood treated in accordance with the process of the invention.

BACKGROUND OF THE INVENTION

In order to prevent decay of wood and timbers, and thereby increase their life, it is common practice to impregnate the wood or timbers with a preservative such as creosote, mixtures of inorganic compounds which are dissolved or dispersed in water, or certain organic compounds which are dissolved in organic solvents. The protection afforded by the application of these materials is dependent upon deep and reasonably uniform penetration into the wood or timber by the preservative material.

The subject of wood treatment and wood preservation is discussed in some detail in the two-volume treatise entitled "Wood Deterioration and its Prevention by Preservative Treatments", Darrel D. Nicholas, Editor, Syracuse Wood Science Series 5, Syracuse University Press, Syracuse, N.Y., 1973. Among the examples of wood preservatives described therein are various creosote compositions, pentachlorophenol, copper naphthenate, copper-8-quinolinolate, organotin compounds, organomercury compounds, zinc naphthenate, chlorinated hydrocarbons, ammoniacal copper arsenate (ACA), acid copper chromate (ACC), zinc salts such as zinc chloride, zinc oxide and zinc sulfate, chromated copper arsenate (CCA), etc.

Wood preservatives such as those described above have been applied to the wood as solutions, emulsions, pastes or dispersions in liquid hydrocarbons and/or aqueous systems. In many applications, the use of aqueous systems is preferred over liquid hydrocarbons because of the odors, flammability and often toxic nature of the liquid hydrocarbons. U.S. Pat. No. 4,507,152 describes aqueous compositions having fungicidal and insecticidal properties which can be used in the treatment of wood. The aqueous compositions comprise oil-soluble metal salts of organic carboxylic acids, halopyridyl phosphates and surfactants. The compositions can be utilized to penetrate wood, and the wood treated with this aqueous system is resistant to fungi and insects.

Although a number of relatively non-toxic aqueous systems have been suggested for preserving wood, many of the wood treating systems used commercially utilize solutions of oil- or hydrocarbon-soluble preservatives. For example, the American Wood-Preservers' Association Standard P9-87 entitled "Standards for Solvents and Formulations for Organic Preservative Systems" describes five hydrocarbon solvent types for preparing solutions of preservatives such as pentachlorophenol, copper naphthenate, etc. The Type A solvent is composed of petroleum distillates or a blend of petroleum distillates and co-solvents provided that the blended solvent meets certain specifications (for example, in practice, mixtures containing high quantities of aromatics are often use with pentachlorophenol to provide pentachlorophenol solvency without the addition of a co-solvent); Type B solvent is based on a volatile petroleum solvent (LPG); Type C solvent is a light hydrocarbon solvent with auxiliary solvent; Type D solvent is a chlorinated hydrocarbon solvent-inhibited grade of methylene chloride; and Type E solvent is an organic solvent composed of petroleum distillates or a blend of petroleum distillates and co-solvents for preparing solutions of pentachlorophenol and dispersions of these in water.

U.S. Pat. No. 4,374,852 describes anti-fungal compositions comprising zinc or copper salts of organic acids which are useful as wood preservatives. Copper and zinc salts are most commonly dissolved in organic solvents such as petroleum- and co-derived solvents such as white spirit, paraffin, gas oil, xylene or naphtha. In U.S. Pat. No. 3,785,770, a wood preservative composition is described which comprises solutions of pentachlorophenol in mineral spirit solvents and, optionally, co-solvents which may be xylene or cyclohexanone.

In some of the applications, the solvents are halogenated hydrocarbon solvents which are relatively low boiling (e.g., less than 140° C. and generally less than 100° C.) such as carbon tetrachloride, chloroform, etc. Such halogenated solvent systems are preferred in wood treatments where it is desirable to remove the solvent after the preservative has penetrated into the wood. U.S. Pat. Nos. 4,013,804 and 3,874,908 are examples of patents describing wood preservative systems containing low boiling solvents. U.S. Pat. No. 3,874,908 describes a process for impregnating wood which utilizes a solution or dispersion of a halogenated hydrocarbon solvent, a wood preservative, and an anti-blooming additive which may be ethylene glycol, propylene glycol, liquid polyglycols of molecular weights of up to about 4000, or lower alkyl monoethers thereof. Suitable halogenated hydrocarbon solvents are described as those which have boiling points of from about room temperature up to about 140° C., preferably up to about 100° C.

The most common commercial procedure for impregnating wood involves contacting the wood with the preservative under relatively high pressure such as 50–150 pounds per square inch for a substantial period of time such as from one hour to 24 hours. The process also may require relatively high temperatures such as about 75° C. to about 105°–110° C.

U.S. Pat. No. 3,200,003 describes a process for impregnating wood with preservatives such as pentachlorophenol and copper guinolinolate which utilizes a solution of the preservative in an aliphatic hydrocarbon solvent which boils below the boiling point of water at ambient atmospheric pressure and readily liquefies at ambient atmospheric temperatures, and a co-solvent such as toluene, benzene, nitrobenzene, isopropyl ether, etc. The process is illustrated on Southern Yellow Pine, Douglas Fir and Red Elm Lumber.

U.S. Pat. No. 4,051,282 describes the production of treated wood with improved penetrability by projectiles. The treating solution utilized in the process contains an impregnant, an aliphatic hydrocarbon or halogenated hydrocarbon liquid carrier, a co-solvent if the solubility of the impregnant in the liquid carrier is inadequate, and an effective amount of lubricating oil. After the treating solution has impregnated the wood, the liquid carrier is evaporated leaving wood containing an impregnant with internal lubrication due to the oil and possibly some co-solvent. The amount of oil used in the process is an effective lubricating amount. The patentees report that the particular effective amount of oil will vary for different species of wood, and for Douglas Fir and Southern Yellow Pine, the practical effective amount of oil added to the treating solution is in the range of around 1.5% to around 15% of the total treating solution (col. 4, lines 13–17). The patentees also disclose that the aliphatic hydrocarbon or halogenated hydrocarbon carriers have boiling points above about 35° C. and below about 130° C.

In order for the chemical treatment to be effective in preserving wood, it is desirable that there be adequate retention of the preservative in the wood and that there is a deep impregnation of the chemicals, particularly the preservatives, into the wood. The extent of penetration and retention obtained by any given process will depend upon the nature of the preservative, the operating conditions, the nature of the wood, etc. For example, it is particularly difficult to penetrate certain types of wood poles or logs such as those derived from Douglas fir, western hemlock, hemfir, etc. It is generally desirable that the preservative penetrate into the wood and extend at least throughout all of the sapwood, and more preferably into the heartwood.

The above-described prior art represents a small sampling of the suggestions which have been made for treating wood with preservative materials to prevent decay. In spite of these many suggestions made in the prior art, there continues to be a need for inexpensive and safe treatments which are effective and which result in deeper and more uniform penetration of the preservative and other chemicals to the core of the wood, especially when the wood to be treated is difficult to penetrate. Difficult-to-penetrate woods are often referred to in the art as "refractory".

SUMMARY OF THE INVENTION

An improved process for penetrating difficult-to-treat wood with preservative liquids containing metal salts is described. More particularly, the improved process comprises the steps of contacting the wood with a mixture comprising (A-1) a preservative-effective amount of at least one hydrocarbon-soluble metal salt of an organic carboxylic acid wherein the metal is selected from the group consisting of transition metals, zinc, mercury, antimony and lead, and (A-2) a hydrocarbon solvent comprising at least 50% by weight of at least one petroleum distillate.

The solvent utilized in the process of the invention optionally may comprise a mixture of at least 50% or more of at least one paraffinic hydrocarbon and one or more aromatic hydrocarbons. Preferably the solvent (A-2) will comprise at least about 60% of at least one paraffinic hydrocarbon having a boiling point above 130° C. The mixture also may contain other desirable components in addition to the metal salts such as insecticides, flame retardants, colorants, fungicides, water repellents, etc.

In a preferred embodiment, the metal salt of the organic carboxylic acid utilized in the process is a fungicide.

DESCRIPTION OF THE PREFERRED EMBODIMENTS

It now has been found that improved penetration of metal salt preservative compositions into difficult-to-treat wood is obtained by the process of the present invention. Examples of difficult-to-treat woods which are indigeneous to the United States include Douglas fir (Pacific Coast type and Intermountain type), western hemlock, hemfir, spruce and western larch. An example of a difficult-to-treat wood from Indonesia is kapur. The penetration of such woods as Douglas-fir woods, and particularly Douglas-fir heartwood which is especially difficult to penetrate with preservative mixtures is improved by use of the mixtures of the invention. In accordance with the present invention, the wood is treated with a mixture which comprises a transition metal salt of an organic carboxylic acid wherein the metal is selected from the group consisting of transition metals, zinc, mercury, antimony and lead, and at least 50% by weight of at least one paraffinic hydrocarbon solvent having a boiling point above 130° C.

(A-1): Metal Salt

The mixtures of the present invention contain a preservative-effective amount of at least one soluble metal salt of an organic carboxylic acid wherein the metal is selected from the group consisting of transition metals, zinc, mercury, antimony and lead. The wood-treating mixture of the invention generally contain from about 0.1 to about 5% by weight of the metal salt and more often the mixtures will contain up to 3% of the metal salt. The metal salts are soluble in the mixture, and most often, the metal salt will be oil-soluble and soluble in the hydrocarbon solvent. The oil-solubility of the metal salts used in the mixture is believed to contribute to the advantageous and desirable results which are obtained. Since the organic compound is oil-soluble and essentially hydrophobic, it therefore does not have a tendency to be extracted or leached from the treated wood even over an extended period of time.

Particularly preferred types of oil-soluble metal salts which are useful in the mixtures of the present invention are the acid, neutral and basic salts of organic carboxylic acids. These salts also are known in the art as "soaps".

The choice of metal contained in the salts will depend upon the properties which are desired to be imparted to the wood being treated, availability, cost and effectiveness. For example, copper salts such as copper naphthenate are fungicides as well as insecticides. Certain metals are more commonly used in the method of the invention, and these include, copper, zinc, zirconium, chromium, iron, antimony, lead and mercury. Salts containing a mixture of the ions of two or more of these metals also can be used.

As mentioned, the salts can be acid, neutral or basic. The acid salts contain insufficient metal cation to neutralize the acid. The neutral salts contain an amount of metal cation just sufficient to neutralize the acidic groups present in the salt anion. The basic salts contain an excess of metal cation and are often referred to as overbased, hyperbased or superbased salts. These acid, basic and neutral salts preferably are of oil-soluble organic carboxylic acids and mixtures of such acids.

The carboxylic acids from which suitable acid, neutral and basic salts can be prepared include aliphatic, cycloaliphatic and aromatic carboxylic acids. The organic carboxylic acids can be either natural or synthetic or mixtures thereof. The examples of natural acids, although usually refined, include straight and branched chain carboxylic acids and mixtures such as tall oil acids and cyclic carboxylic acids such as naphthenic acids. A variety of synthetic carboxylic acids, and particularly aliphatic carboxylic acids or mixtures thereof is useful, and these generally contain six or more carbon atoms.

The metal salts or soaps can be prepared by fusion or precipitation methods. The soaps normally are prepared in an inert liquid medium such as a hydrocarbon oil or solvent. The organic carboxylic acids generally will have at least 6 carbon atoms, more preferably at least 8 carbon atoms, and as many as 30 carbon atoms, but when more than one carboxylic acid is employed, carboxylic acids containing as few as 2 carbon atoms may be employed as one of the acids of the mixture. Examples of useful organic carboxylic acids include acetic acid, propionic acid, butyric acid, isopentanoic acid, hexoic acid, 2-ethyl butyric acid, nonylic acid, decanoic acid, 2-ethylhexoic acid, isooctanoic acid, isononanoic acid, neodecanoic acid, lauric acid, palmitic acid, stearic acid, oleic acid, linoleic acid, naphthenic acid, and commercially available mixtures of two or more carboxylic acids such as naphthenic, tall oil acids, rosin acids, etc.

Examples of acid salts are acid copper salts containing less than a stoichiometric equivalent of copper per acid equivalent. For metals other than copper, the basic salts or soaps are preferred since these contain higher amounts of metal. For example, solutions of normal zinc salts of monocarboxylic acids such as neodecanoic acid contain about 6% zinc by weight whereas a solution of a basic zinc neodecanoate can contain up to about 16% by weight or more of zinc.

Basic metal salts or soaps of carboxylic acids also can be prepared by methods well known in the art. Examples of neutral and basic salts and of metal salt complexes as well as their preparation can be found in, for example, U.S. Pat. Nos. 2,251,798; 2,955,949; 3,723,152; and 3,941,606 which disclosures are herein incorporated by reference. Some of the basic salts have been referred to as complexes because they are not simple salts. For example, the basic compositions described in U.S. Pat. No. 3,941,606 are referred to as "metal carboxylate-alkoxy alcoholate" complexes. For the purpose of this invention such basic complexes are to be included in the term metal salts or soaps as used in this specification and claims.

Specific examples of the salts or soaps which are useful in the invention include those described below in Table I and the following specific examples.

TABLE I

| | Carboxylate Metal Salts | | |
|---|---|---|---|
| Component | Metal | Metal Content (Wt. %) | Acid |
| A-1-1 | Cu | 16 | neodecanoic |
| A-1-2 | Cu | 11 | neodecanoic |
| A-1-3 | Cu | 10 | naphthenic |
| A-1-4 | Zn | 18 | 2-ethyl hexoic |
| A-1-5 | Zn | 8 | naphthenic |
| A-1-6 | Zn | 10 | mixture of $C_{9-13}$ |
| A-1-7 | Pb | 10 | naphthenic |

The preparation of the above-described metal salts is illustrated by the following examples. All parts and percentages in the following examples, and elsewhere in the specification and claims, are by weight unless otherwise stated.

EXAMPLE A-1-1

A mixture of 260 parts of crude neodecanoic acid, 103 parts of propionic acid, 400 parts of mineral spirits, 172 parts of copper powder, 91 parts of Methyl Cellosolve, 14 parts of dipropylene glycol, 70 parts of water, 10 parts of octyl-phenoxy polyethoxy ethanol (Triton X-15 from Rohm & Haas Company) and 3 parts of Santoflex-77 is prepared and sparged with air while heating to a temperature of about 80° C. Reaction under these conditions continues for about 6 hours. A small amount of boric acid (7 parts) is added and the heating is continued at 80° C. with air sparging. The reaction is continued at this temperature until about 1.8 equivalents of metal are reacted per equivalent of acid (total, 14 hours). The mixture is heated for an additional 2 hours at a temperature of about 150° C. until about 1.9 equivalents of metal are reacted per equivalent of acid. The air blowing is terminated, and an inert nitrogen atmosphere is employed while the mixture is slowly heated to about 150° C. over a period of 8 hours while excess water is removed.

Four approximately equal proportions of amyl phosphate totalling 176 parts are added at 3-hour intervals while maintaining a temperature of about 145° C. and a nitrogen atmosphere. The mixture then is cooled to about 125° C., settled to remove excess copper and filtered.

The filtered product is heated under vacuum to a temperature of about 150° C. in order to remove the mineral spirits to yield the desired concentration of metal.

The compositions of Examples A-1-2 through A-1-7 in Table I can be prepared by methods similar to those described above for A-1-1 or by alternative procedures known in the art.

EXAMPLE A-1-8

A mixture of 840 parts of distilled naphthenic acid, 176 parts of 2-ethyl hexanoic acid, 512 parts of mineral spirits, 48 parts of Carbitol (a diethylene glycol ether available commercially from Union Carbide Corp.), 4.8 parts of acetic acid, 1.6 parts of water and 10.9 parts of an anti-foam agent is charged to a reactor, and the mixture is heated with agitation to a temperature of about 65° C. The mixture is sparged with carbon dioxide and 214.4 parts of zinc oxide are added to the mixture which is then heated to a temperature of about 105° C. The reaction is continued at this temperature while periodic checks are made for percent zinc, the acid value and percent water. If necessary, the acid value is adjusted to minus 33 to minus 38 for 10% zinc. If the water content is over 0.4%, the mixture is dehydrated.

About 100 parts of filter aid are added with stirring to the mixture which is then filtered. The filtrate is a clear liquid which is adjusted to a zinc content of 10% using mineral spirits to form the desired product.

Mineral spirit solutions of metal carboxylate salts of the type described above are available commercially such as from Mooney Chemicals, Inc., Cleveland, Ohio, 44113, under the general trade designations TENCEM, CEM-ALL, NAP-ALL, HEX-CEM, LIN-ALL, and NEO-NAP. These mineral spirit solutions can be adapted for use in preparing the penetrating solutions of the present invention by mixing said mineral spirit solutions with additional mineral spirits and/or other petroleum distillates or paraffinic hydrocarbons having boiling points above 130° C. Alternatively, the mineral spirits may be removed and the residue mixed with other paraffinic hydrocarbon solvents, e.g., higher boiling solvents.

Mixtures of the carboxylic acid salts such as those described in Table I are easily prepared and utilized in accordance with the invention. For example, a mixture in accordance with the invention is prepared from equal parts of components A-1-1 and A-1-6 resulting in a mixture containing 8% copper and 5% zinc. A mixture of two parts of component A-1-1 with one part of component A-1-6 will contain 10.7% copper and 3.3% of zinc.

The metal salts which are utilized in the solutions of the present invention also may be prepared by conventional procedures such as by the reaction of copper metal or a copper salt with the acid, for example, naphthenic acid. When the acid is a liquid, solvents are not generally required. The metal salts prepared in this manner may be either acid or neutral salts as described above and can be dissolved in hydrocarbon solvents for use in the process of the present invention.

Examples of other neutral and basic salts include lead naphthenate, lead neodecanoate, lead 2-ethyl hexoate, lead tallate, zinc tallate, chromium 2-ethyl hexoate, chromium tallate, chromium oleate, antimony octoate, antimony oleate, iron naphthenate, iron tallate, phenyl mercury oleate, mercury dioleate, etc.

Although a wide variety of metal salts can be utilized in the process of the present invention, it generally is preferred that the metal salt utilized in the process is a fungicide, and, accordingly, the metal of the metal salt generally will be at least one of zinc, copper, chromium, zirconium, iron, antimony, lead or mercury. In addition to the metal salts described above, other metal salts known in the art can be applied to Douglas fir in accordance with the process of the present invention. For example, metal salt compositions are described in U.S. Pat. No. 4,374,854 which are mixtures of salts of primary and/or secondary saturated acyclic carboxylic acids and a tertiary saturated acyclic carboxylic acid with zinc or copper. Such salts are useful in the process of the present invention.

(A-2): Paraffinic Hydrocarbon Solvent

The second required component of the mixture utilized in the method of the present invention is (A-2) at least one paraffinic hydrocarbon solvent. As used in this specification and claims, the term "paraffinic hydrocarbon" includes paraffins or aliphatic hydrocarbons ($C_nH_{2n+2}$) as well as cycloparaffins or alicyclic hydrocarbons ($C_nH_{2n}$). Suitable paraffinic solvents include aliphatic and alicyclic hydrocarbon solvents such as petroleum distillates and other paraffinic hydrocarbons having boiling points above 130° C. The hydrocarbon solvent mixtures of the invention comprise at least 50% by weight of said paraffinic hydrocarbons, and more preferably at least about 60% of said paraffinic hydrocarbons.

The paraffinic hydrocarbon solvent may be any aliphatic or alicyclic hydrocarbon solvent having a boiling point above 130° C. A practical upper limit on the boiling point is about 750° F. (about 400° C.). Mixtures of aliphatic and alicyclic hydrocarbons may be sed. Many commercially available paraffinic hydrocarbons are mixtures of aliphatic and alicyclic hydrocarbons and smaller amounts of aromatic hydrocarbons. In one preferred embodiment, the paraffinic hydrocarbon solvents are petroleum distillates which include mineral spirits, kerosene, naphtha, diesel fuels, gas oils and fuel oils. Specific examples of paraffinic hydrocarbon solvents useful in the present invention include solvents which are principally paraffinic such as No. 1 diesel fuel, No. 2 diesel fuel, Varsol TM, Stoddard Solvent, Pennzoil 510 oil, mineral spirits, white spirits, light naphtha, heavy naphtha, light gas oil, heavy gas oil, and various commercially available kerosene fractions.

In addition to the above-described paraffinic hydrocarbons, the solvent utilized in the method of the present invention may contain one or more aromatic hydrocarbon solvents such as xylene, and commercially available solvents which are principally aromatic such as Shell P9 Wood-Treating oil (Shell Chemical Company) and Lilyblad Base LN Oil (Shell Canada).

As mentioned above, many commercially available petroleum distillates are mixtures of several hydrocarbons. For example, No. 2 diesel fuel generally is considered to be a mixture of about 40% aliphatics, 40% alicyclics and 20% aromatics. The Lilyblad Base LN oil from Shell is about 65% aromatics and 35% paraffinic.

When the solvent of the present invention comprises a combination of a paraffinic hydrocarbon solvent and an aromatic hydrocarbon solvent, the amount of paraffinic hydrocarbon having a boiling point above 130° C. present in the solvent mixture is at least about 50% by weight, and more preferably at least about 60% by weight based on the total weight of solvent.

The mixtures of the present invention also may contain minor amounts of other aliphatic solvents in addition to those boiling above 130° C. For example small amounts of lower boiling hydrocarbons or halohydrocarbons, including liquified hydrocarbons may be included in the wood-treating mixtures. It should be noted, however, that acceptable penetration and retention is obtained with the mixtures of the invention which do not contain such lower boiling hydrocarbons. In one embodiment, the wood-treating mixtures of the invention can contain up to about 10% or 20% of low boiling hydrocarbons such as liquified propane, n-butane, isobutane, n-pentane, isopentane, or mixtures thereof.

The mixtures which are utilized in the present invention for preserving wood also may contain oxygen-containing organic polar liquids. The polar liquids may be alcohols, polyols, ethers, aldehydes, ketones, acetals or carboxylic acid esters, and mixtures thereof. In one embodiment, the mixtures contain at least about 1% by weight of the polar liquid up to about 20% by weight.

A wide variety of oxygen-containing polar liquids may be utilized in the present invention as component. Among the alcohols which can be utilized are alcohols containing up to about 30 or 35 carbon atoms including, butanol, hexanol, heptanol, octanol, 2-ethyl hexanol, nonanol, decanol, dodecanol, hexadecanol, etc., as well as mixtures of such alcohols obtained from the oxo process. Examples of polyols and polyether polyols which can be utilized as a component in the present invention include liquid polyalkylene glycols having molecular weights of up to about 4000 or higher. Glycol ethers also are useful and these include the $C_{1-4}$ alkyl monoethers of the above glycols and polyols such as the methyl, ethyl and butyl monoethers of the mono-, di- and tri-ethylene and propylene glycols. Specific examples include diethylene glycol, dipropylene glycol, tripropylene glycol, ethylene glycol methyl ether, diethylene glycol butyl ether, propylene glycol methyl ether, dipropylene glycol methyl ether and tripropylene glycol methyl ether, and mixtures of any two or more of these compounds.

Mixtures of alcohols with the ethers, acetals and esters of such alcohols are useful as a component in the wood-treating mixtures of the present invention and are available from a variety of sources, primarily as by-products of the oxo process for preparing alcohols. For example, a product is available from Eastman Chemical Products, Inc. under the general product name "Solvent B-11" which comprises a mixture of 2-ethylhexanol; $C_7$ alcohol and $C_9$ ether or acetal or esters; $C_9$ branched alcohols and $C_{10-11}$ ethers or acetals or esters; $C_{10}$ branched alcohols and $C_{11-12}$ ethers or acetals or esters; and $C_{14}$, $C_{15}$ and $C_{16}$ ethers or acetals or esters. This yellow liquid has a boiling range of 350°–600° F. and a flash point of 165° F. (74° C.). Another useful commercial mixture is available from Exxon Chemical under the product designation "Decyl alcohol bottoms". This material is a heavy fraction from the oxo process and comprises generally $C_{18-22}$ primary alcohols; $C_{27-33}$ esters; $C_{18-22}$ esters; $C_{18-22}$ ethers; $C_{10-14}$ alcohols; and $C_{15-18}$ alcohols.

The oxygen-containing organic polar liquid also may be an aldehyde, a ketone, or mixtures thereof. Specific examples of such aldehydes or ketones include isobutyl aldehyde, decyl aldehyde, methyl isobutyl ketone, methyl heptyl ketone, diisobutyl ketone, methyl isoamyl ketone, trimethyl heptanone, and other higher boiling ketones. Mixtures of such ketones are useful, and an example of a commercially available mixture of ketones useful as component in the present invention is "Solvent KB-3" from Eastman Chemical Products, Inc. Solvent KB-3 is a mixture comprising 95% of dimethyl heptanone and other high boilers, about 2% of diisobutyl ketone, about 1% of methyl isobutyl ketone, 1% of methyl heptyl ketone, about 0.5% of methyl isoamyl ketone and 0.5% of methyl amyl ketone. This mixture has a boiling point of 202° C. (396° F.) and a flash point of 69° C. (156° F.).

The oxygen-containing organic polar liquid useful in the present invention also may be one or more carboxylic acid esters. Generally, the esters will be the lower alkyl esters ($C_{1-5}$) of carboxylic acids such as hexanoic acid, octanoic acid, and fatty acids such as decanoic acid, lauric acid, palmitic acid, stearic acid and oleic acid. Specific examples of esters include ethyl hexoate, ethyl octoate, methyl laurate, methyl stearate, propyl decanoate, propyl stearate, etc.

The above mixtures of components (A-1) and (A-2) can be prepared by techniques known in the art such as by dissolving solid metal salts in the aliphatic hydrocarbon solvent or mixture of aliphatic and aromatic hydrocarbon solvent. Alternatively, when the metal salt is available in concentrated solution form, the concentrate can be diluted with a hydrocarbon solvent to form the treating or penetrating solution containing the desired amount of metal salt. The order of mixing the components is not critical. Generally, the mixtures comprising components (A-1) and (A-2) will be solutions since the preferred transition metal salts (A-1) are soluble in hydrocarbon solvents.

The mixtures used in the method of the present invention also may contain other additives which impart desirable properties to the treated Douglas fir. For example, the mixtures may contain anti-foam agents, surfactants, antioxidants, flame retardant compositions, water repellents, coloring agents, insecticides, odorants, moldicides, etc., and mixtures thereof. The amount of such additives included in the solutions of the invention may vary over a rather wide range although amounts of from about 0.01 to about 5% of these compositions generally are satisfactory.

Inorganic fire retardant compositions are particularly useful in the solutions of the invention. Examples of inorganic materials include metal oxides which are well known in the art such as antimony oxide, etc. Examples of organic fire retardants include a number of halogenated and organophosphorus compounds which may be dispersed in the solutions.

Although the wood treated in accordance with the method of the invention may have a satisfactory appearance for most purposes, the appearance can be modified if desired by imparting different color effects. The present invention contemplates the inclusion of coloring agents in the solutions of the invention. Any of the known oil-soluble or water-dispersible coloring agents can be used. These agents are mixed either with the concentrates of metal salts described above, or the solutions, and when the wood is immersed in the solutions containing coloring agents, the coloring agents penetrate the wood with the metal salts and give desirable coloring effects which in many instances emphasize the grain of the wood. Examples of coloring agents which may be used depending on the desired results include: Bruco Creosote Brown RGY available from Bruce Chemical Co., Iron Cem-All available from Mooney Chemical, Inc., and Pylaklor Red Brown LX-6249 available from Pylam Dye Co.

Insecticides also can be included in the solutions of the invention, and it is preferable that the insecticide either be soluble in oil or water. Examples of such insecticides include Dursban TC available from Dow Chemical Ficam 76WP available from BFC Chemicals, Inc. and Permethrin, available from Mooney Chemical Company under the designation "M-Gard TM W320".

Odorants can be included in the solutions used in the process of the invention, and one preferred odorant is pine oil. Other compounds having desired odors can be included in the solutions.

Water repellents may be included in the solutions used in the invention to provide the wood with improved water repellency. Examples of such repellents include waxes and paraffins soluble in the solvent (A-2) as well as resin type materials such as silicone resins, hydrocarbon resins such as Piccopate 100 (Pennsylvania Industrial Chemicals), etc. Various other chemicals have been suggested for this purpose in the art of wood treating.

The method of the present invention for preserving difficult-to-treat wood comprises contacting the wood with mixtures comprising components (A-1) and (A-2), and any optional ingredients as described above for a period of time and at a temperature sufficient to enable the desired amount of transition metal salt to penetrate into the wood to a depth which is sufficient to provide the wood with the desired preservative properties. The contact between the wood and the mixtures of the present invention should be effected by completely immersing the wood. Preferably, contact between the wood and the mixtures of the present invention is effected by immersing the wood in the mixture heated to a temperature of up to about 250° F. (generally 160°–220° F.) for a period of time and at an appropriate pressure which is sufficient to obtain the desired result.

The method of the invention also can be conducted on wood contained in an enclosed vessel under vacuum or pressure conditions or a combination thereof. The use of pressure for improving the penetration of various chemicals into all types of wood is well known in the art. In this technique, the wood is placed in a chamber which is sealed and evacuated in a regulated cycle which is related to and determined from a consideration of the species of wood. Generally, the period of evacuation will vary from about 15 minutes to one hour, and the pressure within the sealed chamber is brought to a level of about two inches of mercury or less. The purpose of this step is to remove air and wood volatiles from the wood. The mixtures of the present invention then are introduced into the enclosed container, and the amount of the mixture should be sufficient to immerse the wood completely. Pressurization of the vessel then is initiated, and the pressure is maintained at a desired level for a given period of time. Initially, the pressure within the vessel may decrease as the mixture within the container penetrates into the wood. The pressure may be raised to maintain a desirable level throughout the penetration period of treatment. Stabilization of the pressure within the vessel is an indication that there is no longer any penetration of the liquid into the wood. At this point, the pressure can be released, the vessel drained, and the wood removed. The details of the pressure process, including pressure ranges, concentration of the treating mixture and the cycling of vacuum and pressure can be readily determined by one skilled in the art.

The actual time of contact of the wood with the solutions will vary depending on a variety of factors such as, for example, (1) the level of pressure within the vessel, (2) the amount of metal salt to be introduced into the wood, (3) the difficulty of penetration into the particular type of wood being treated, and (4) whether the wood is green wood or seasoned wood. Green wood generally is defined as wood containing 30% or more by weight of water. Dry or seasoned wood is defined as wood containing less than 30% by weight of water based on oven-dried wood.

The method of the present invention has been found to be particularly useful on Douglas fir. For example, the treatment of Douglas-fir utility poles with mixtures comprising components (A-1) and (A-2) as described above results in deep and uniform penetration of the transition metal salts throughout the sap wood and, generally, there is penetration of the transition metal salt into the heartwood. In contrast, when an aromatic solvent is used in place of the paraffinic solvent (i.e., there is little or no paraffinic solvent present), the transition metal salt does not penetrate as far into the Douglas-fir utility poles, and the penetration which is accomplished is not as uniform. Improved results are obtained when the wood-treating mixture contains only the paraffinic solvent or a mixture of paraffinic and aromatic solvents containing at least 50% of the high boiling (above 130° C.) paraffinic solvent, and preferably at least 60% and more preferably above 70% of the high boiling paraffinic solvent. The process of the invention also can be used to treat utility pole crossarms which may be about 4×5-inch timbers made from Douglas-fir heartwood, and improved penetration of the chemicals is obtained.

The following examples illustrate the compositions useful in the methods of the present invention

| | Parts |
|---|---|
| Composition (A) | |
| Copper naphthenate (A-1-3) | 10 |
| Pennzoil 510 oil | 90 |
| Composition (B) | |
| Zinc salt of Example (A-1-6) | 8 |
| No. 2 diesel fuel | 92 |
| Composition (C) | |
| Copper naphthenate (A-1-3) | 12 |
| Mineral Spirits | 38 |
| P-9, Type A oil | 50 |
| Compositions (D)-(K) | |

These compositions illustrate mixtures of copper naphthenate with several different combinations. Copper naphthenate solutions containing 1% copper are prepared by mixing copper naphthenate with the indicated solvent mixture of No. 2 diesel fuel (a predominantly paraffinic solvent) and Lilyblad Base Oil LN (a predominantly aromatic solvent). The solvent combination utilized in the various compositions is as follows:

TABLE II

| | Parts | | | | | | | |
|---|---|---|---|---|---|---|---|---|
| Solvent | D | E | F | G | H | I | J | K |
| Diesel Fuel | 30 | 40 | 50 | 60 | 70 | 80 | 90 | 100 |
| Lilyblad Base Oil LN | 70 | 60 | 50 | 40 | 30 | 20 | 10 | 0 |

The following examples illustrate the method of the invention for preserving wood.

EXAMPLE 1

Step A

An air-seasoned Douglas-fir log (about 20 inches long) is placed in a steel pressure vessel. An initial air pressure of about 10 psig. is applied for 10 minutes. A hydrocarbon solution (composition (A)) is pumped into the vessel at 10 psig. and at ambient temperature until the vessel is hydrostatically full. The temperature is increased to 200° F. and held for two hours. The hydrostatic pressure is increased by 10 psig. every 5 minutes until the pressure reaches 130 psig. This pressure is maintained for 3 hours.

Step B

The hydrocarbon solution is removed from the vessel, and the pressure released down to 10 psig. and finally to atmospheric pressure. The log is removed. Examination of the log reveals a significant uptake of the solution by the log with acceptable and uniform depth of penetration.

EXAMPLE 2

Douglas-fir heartwood crossarms (4″×5″×20″), both incised and non-incised, and which also contain several ½-inch bore holes, are pressure-treated with a solution of copper naphthenate in aliphatic solvents such as Pennzoil 510 oil and No. 2 diesel fuel. The solutions contain about 0.68% by weight of copper. The pressure treatments are either full cell or empty cell pressure treatments, and the ends of the crossarms are sealed prior to placement in the pressure vessel. At the conclusion of the pressure treatment, the crossarms are recovered, and the extent of longitudinal penetration from the edge of a bore hole is determined. A minimum of 3 inches of longitudinal penetration is required for acceptance by the industry. The details of the procedure and the results of the test (2A and 2B) are summarized in the following table.

For comparison, matching Douglas-fir heartwood crossarms are also treated in the same manner except that aromatic solvents (Lilyblad LN and Lilyblad LN+5% B-11) are used in lieu of the aliphatic solvents. These experiments are identified in the table as 2-C-1 and 2-C-2.

TABLE III

| Example | Solvent | a | b | c | Maximum Longitudinal Penetration d |
|---|---|---|---|---|---|
| 2A | 510 oil | 1 | 2 | 3 | Third inch |
| 2B | No. 2 Diesel Fuel | 0 | 2 | 2 | Third inch |
| 2-C-1 | Lilyblad base LN | 1 | 0 | 0 | First inch |
| 2-C-2 | Lilyblad base LN + 5% B-11 | 2 | 2 | 0 | Second inch |

a Number of full cell tests.
b Number of empty cell tests
c Number of runs achieving 3-inch penetration.
d From bore hole.

EXAMPLE 3

The procedure of Example 2 is repeated except that the ends of the Douglas-fir heartwood boards are not sealed, and the end penetration is evaluated. End penetration of eight inches longitudinally into the board is obtained with the aliphatic solvents whereas the penetration with the aromatic solvents is only slightly over three inches in the longitudinal direction.

The results obtained in Examples 2 and 3 demonstrate the improved penetration of the transition metal containing preservative into Douglas-fir heartwood which is obtained using aliphatic solvents when compared to the penetration obtained using aromatic hydrocarbons.

EXAMPLE 4

Matched Douglas-fir heartwood blocks (1.5"×1.5"×9") are cut from a kiln-dried board. From three to six blocks are used for each treatment. The two longitudinal or end faces of each block are coated with an epoxy resin to seal the surface. The blocks are placed in a small pilot cylinder on a metal screen, and a second screen is placed on top of the blocks covered by a weight. The preservative solution is poured into the cylinder to cover the top of the blocks by approximately one inch. The lid is bolted on the cylinder and the heater is turned on to preheat the solution and the blocks at atmospheric pressure. Upon reaching a liquid temperature at about 185° F., the pressure on the unit is increased to 130 psig at a rate of 10 psig/5 minutes. The pressure is maintained on the cylinder for 1.5 hours after reaching 130 psig. At the end of the treatment, the pressure is vented from the cylinder and the preservative solution is withdrawn. The blocks are removed and weighed. Approximately two weeks after treating, the blocks are cut open at mid point to visually determine preservative penetration.

The preservative solutions utilized in this example are the solutions of compositions (D) through (K) and control compositions 4-C-1, 4-C-2 and 4-C-3 also containing 1% copper as copper naphthenate. In composition 4-C-1, the solvent is the aromatic solvent, Lilyblad Base Oil LN; in 4-C-2, the solvent is 10% No. 2 diesel fuel and 90% Lilyblad Base Oil LN; and in 4-C-3, the solvent is 20% No. 2 diesel fuel and 70% Lilyblad Base Oil LN.

The increase in weight of the samples represents the retention of the compositions in the wood samples. The average of the weight increases (retention) for each treatment are summarized in Table IVA.

TABLE IVA

| Average Retention | |
|---|---|
| Composition | Average Retention (pcf) |
| 4-C-1 | 6.51 |
| 4-C-2 | 10.75 |
| 4-C-3 | 5.01 |
| D | 4.25 |
| E | 5.25 |
| F | 10.69 |
| G | 13.98 |
| H | 13.27 |
| I | 11.57 |
| J | 13.16 |
| K | 13.40 |

The retention data also is analyzed by linear regression. The ranges analyzed are (a) 0-50% diesel fuel; (b) 40-70% diesel fuel; and (c) 50-100% diesel fuel. The calculated estimated retention (pcf) based upon the linear regression data on the treated blocks in the 0-50% range, the 40-70% range and the 50-100% range are found in the following Tables IVB-IVD, respectively.

TABLE IVB

| Linear Regression Data 0-50% Range | |
|---|---|
| Diesel Fuel Content (%) | Estimated Retention |
| 0* | 4.65 |
| 10 | 4.92 |
| 20 | 5.18 |
| 30 | 5.44 |
| 40 | 5.71 |
| 50 | 5.97 |

*Actually programmed a very small number since program would not accept 0.

TABLE IVC

| Linear Regression Data 40-70% Range | |
|---|---|
| Diesel Fuel Content (%) | Estimated Retention |
| 40 | 5.59 |
| 50 | 8.21 |
| 70 | 13.43 |

TABLE IVD

| Linear Regression Data 50-100% Range | |
|---|---|
| Diesel Fuel Content (%) | Estimated Retention |
| 50 | 11.61 |
| 70 | 12.19 |
| 80 | 12.48 |
| 90 | 12.77 |
| 100 | 13.06 |

The results summarized in Tables IVB, IVC and IVD illustrate the improved retention obtained on Douglas-fir heartwood with the compositions of the present invention. Particularly improved retention on the heartwood is obtained when the solvent contains at least about 60% No. 2 diesel fuel and the best results are obtained when the solvent contains at least about 70% No. 2 diesel fuel.

The average penetrations for blocks treated with compositions D through K as well as control compositions 4-C-1, 4-C-2 and 4-C-3 are reported in the following Table IVE. The values reported in Table IVE are averages of the various samples, and the data has not been analyzed by linear regression. As can be seen from the results in Table IVE, the samples treated with blends of 50% or more of No. 2 diesel fuel have better penetrations than those treated with less than 50% of the diesel fuel.

TABLE IVE

| Average Penetration | | | |
|---|---|---|---|
| Composition | Solvent Fuel Oil/Aro | Avg. Penetration (inch) Tangential | Radial |
| 4-C-1 | 0/100 | 0.13 | 0.38 |
| 4-C-2 | 10/70 | 0.25 | 0.38 |
| 4-C-3 | 20/80 | 0.13 | 0.35 |
| D | 30/70 | 0.06 | 0.31 |
| E | 40/60 | 0.06 | 0.44 |
| F | 50/50 | 0.25 | 0.50 |
| G | 60/40 | 0.44 | 0.63 |
| H | 70/30 | 0.31 | 0.56 |
| I | 80/20 | 0.25 | 0.50 |
| J | 90/10 | 0.50 | 0.63 |
| K | 100/0 | 0.44 | 0.50 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A method of preserving difficult-to-treat wood which comprises contacting the wood under pressure with a mixture comprising (A-1) a preservative-effective amount of at least one hydrocarbon-soluble metal salt of an organic carboxylic acid, wherein the metal is selected from the group consisting of transition metals, zinc, mercury, antimony and lead, and (A-2) a hydrocarbon solvent comprising at least 50% of at least one petroleum distillate.

2. The method of claim 1 wherein the wood is Douglas fir.

3. The method of claim 1 wherein the hydrocarbon solvent (A-2) also contains at least one aromatic solvent.

4. The method of claim 1 wherein the petroleum distillate is selected from the group consisting of mineral spirits, kerosene, naphtha, gas oil, fuel oil or a diesel fuel.

5. The method of claim 1 wherein the metal content of the mixture is from about 0.1 to about 5% by weight.

6. The method of claim 1 wherein the metal of the metal salt (A-1) is zinc, copper, chromium, iron, antimony, lead, or a mixture thereof.

7. The method of claim 1 wherein the carboxylic acid (A-1) is at least one aliphatic or alicyclic monocarboxylic acid containing from about 6 to about 30 carbon atoms.

8. The method of claim 1 wherein the metal of the metal salt (A-1) is copper or zinc.

9. A method of preserving difficult-to-treat wood which comprises contacting the wood in an enclosed vessel under pressure with a mixture comprising (A-1) a preservative-effective amount of at least one hydrocarbon-soluble transition metal salt of an organic carboxylic acid, wherein the metal is selected from the group consisting of transition metals, zinc, mercury, antimony and lead, and (A-2) a hydrocarbon solvent comprising at least about 50% by weight of at least one paraffinic hydrocarbon having a boiling point above 130° C.

10. The method of claim 9 wherein the wood is selected from the group consisting of Douglas fir, western hemlock, hemfir, western larch, spruce and kapur.

11. The method of claim 9 wherein the hydrocarbon solvent (A-2) also contains at least one aromatic solvent.

12. The method of claim 9 wherein the paraffinic hydrocarbon is a petroleum distillate.

13. The method of claim 12 wherein the petroleum distillate is mineral spirits, kerosene, naphtha, gas oil, fuel oil, or a diesel fuel.

14. The method of claim 9 wherein the metal content of the mixture is from about 0.1 to about 5% by weight.

15. The method of claim 9 wherein the metal of the metal salt (A-1) is zinc, copper, chromium, iron, antimony, lead, or a mixture thereof.

16. The method of claim 9 wherein the carboxylic acid in (A-1) is at least one aliphatic or alicyclic monocarboxylic acid containing from about 6 to about 30 carbon atoms.

17. The method of claim 9 wherein the metal salt (A-1) is a fungicide.

18. The method of claim 9 wherein the metal of the metal salt (A-1) is copper or zinc.

19. The method of claim 9 wherein the solvent (A-2) contains at least about 60% by weight of the paraffinic hydrocarbon.

20. The method of claim 9 wherein the solvent (A-2) contains from about 60% to about 100% by weight of the paraffinic hydrocarbon and from about 0–40% by weight of an aromatic hydrocarbon.

21. A method of preserving Douglas-fir heartwood which comprises contacting the wood under pressure with a mixture comprising (A-1) from about 0.1 to about 2% by weight of at least one soluble zinc, copper, chromium, iron, antimony, or lead salt of at least one organic monocarboxylic acid containing from about 8 to about 30 carbon atoms, and (A-2) a hydrocarbon solvent comprising at least about 50% of at least one paraffinic hydrocarbon having a boiling point above 130° C.

22. The method of claim 21 wherein the solvent (A-2) comprises at least about 60% by weight of the paraffinic hydrocarbon.

23. The method of claim 21 wherein the hydrocarbon solvent (A-2) also contains at least one aromatic hydrocarbon.

24. The method of claim 21 wherein the metal salt (A-1) is a copper or zinc salt.

25. The method of claim 21 wherein the metal salt (A-1) is a fungicide.

26. The method of claim 21 wherein the mixture also contains a flame-retardant.

27. The method of claim 21 wherein the mixture also contains an insecticide.

28. The method of claim 21 wherein the mixture also contains a moldicide.

29. The method of claim 21 wherein the mixture also contains a water repellent.

30. Wood treated in accordance with the method of claim 1.

31. Wood treated in accordance with the method of claim 21.

* * * * *